US012506302B2

(12) United States Patent
Yang et al.

(10) Patent No.: US 12,506,302 B2

(45) **Date of Patent: *Dec. 23, 2025**

(54) CABLE CONNECTOR AND CONNECTOR ASSEMBLY

(71) Applicant: AMPHENOL ASSEMBLETECH (XIAMEN) CO., LTD, Fujian (CN)

(72) Inventors: Wenchu Yang, Fujian (CN); Weishun Chen, Fujian (CN); Chungang Zhang, Fujian (CN); Zhenxing Liu, Fujian (CN); Haitao Xiong, Fujian (CN); Hang Li, Fujian (CN)

(73) Assignee: AMPHENOL ASSEMBLETECH (XIAMEN) CO., LTD, Xiamen (CN)

( * ) Notice: Subject to any disclaimer, the term of this patent is extended or adjusted under 35 U.S.C. 154(b) by 454 days.

This patent is subject to a terminal disclaimer.

(21) Appl. No.: 18/099,272

(22) Filed: Jan. 20, 2023

(65) Prior Publication Data

US 2023/0318227 A1 Oct. 5, 2023

(30) Foreign Application Priority Data

Mar. 31, 2022 (CN) ........................ 202220737701.3

(51) Int. Cl.

| | |
|---|---|
| ***H01R 13/64*** | (2006.01) |
| ***H01R 12/70*** | (2011.01) |
| ***H01R 12/75*** | (2011.01) |
| ***H01R 13/631*** | (2006.01) |
| ***H01R 13/633*** | (2006.01) |

(52) U.S. Cl.

CPC ......... *H01R 13/64* (2013.01); *H01R 12/7005* (2013.01); *H01R 12/75* (2013.01); *H01R 13/631* (2013.01); *H01R 13/633* (2013.01)

(58) Field of Classification Search

CPC .... H01R 13/64; H01R 12/7005; H01R 12/75; H01R 13/631; H01R 13/633; H01R 13/6335; H01R 13/6594; H01R 12/716; H01R 27/02

See application file for complete search history.

(56) References Cited

U.S. PATENT DOCUMENTS

| | | | | |
|---|---|---|---|---|
| 6,896,556 B1 * | 5/2005 | Wu | H01R 31/06 | 439/660 |
| 8,777,664 B2 * | 7/2014 | Gui | H01R 13/6471 | 439/607.25 |
| 9,106,217 B2 * | 8/2015 | Jaussi | H03K 19/0008 | |
| 9,640,910 B1 * | 5/2017 | Chien | H01R 13/6275 | |

(Continued)

*Primary Examiner* — Travis S Chambers

(57) ABSTRACT

Disclosed are a cable connector and a connector assembly. The cable connector includes a first insulator, wherein a first electrical connection portion, a second electrical connection portion and a third electrical connection portion are sequentially arranged in the first insulator in a length direction thereof. The first electrical connection portion, the second electrical connection portion and the third electrical connection portion are connected to a first cable, a second cable and a third cable, respectively. One of the first electrical connection portion, the second electrical connection portion and the third electrical connection portion is a power supply electrical connection portion, and at least one of the first electrical connection portion, the second electrical connection portion and the third electrical connection portion is a signal connection portion.

23 Claims, 6 Drawing Sheets

(56) References Cited

U.S. PATENT DOCUMENTS

| | | | | |
|---|---|---|---|---|
| 2010/0099307 | A1* | 4/2010 | Zhang | H01R 27/00<br>439/660 |
| 2023/0128773 | A1* | 4/2023 | Mutnury | H01R 12/58<br>439/78 |
| 2023/0318209 | A1* | 10/2023 | Yang | H01R 13/631<br>439/55 |
| 2023/0318215 | A1* | 10/2023 | Yang | H01R 12/75<br>439/59 |

* cited by examiner

CABLE CONNECTOR AND CONNECTOR ASSEMBLY

CROSS REFERENCE TO RELATED APPLICATIONS

The present application claims the benefit of Chinese Patent Application No. 202220737701.3 filed on Mar. 31, 2022, the contents of which are incorporated herein by reference in their entirety.

FIELD OF TECHNOLOGY

The present invention belongs to the technical field of connectors, and in particular relates to a cable connector and a connector assembly.

BACKGROUND

At present, a high-speed connector is usually provided with only one terminal set and electrical connection portions. However, when multiple interfaces are required for plugging, the number of connectors needing to be used is large, leading to large overall space occupation, which is not conducive to product layout. Therefore, it is expected to develop a cable connector which can connect a plurality of electrical connection portions and has a compact structure.

SUMMARY

For the defects in the prior art, an objective of the present invention is to provide a cable connector and a connector assembly. A first electrical connection portion, a second electrical connection portion and a third electrical connection portion, including a power supply connection portion and a signal connection portion, are integrated by the cable connector, and thus the space is saved. Moreover, a front plugging portion and a rear plugging portion located on a front side and a rear side of the first insulator can be stably plugged into plugging slots on a board connector.

To achieve the objective above, the present invention provides a cable connector. The cable connector includes:

- a first insulator, wherein a first electrical connection portion, a second electrical connection portion and a third electrical connection portion are sequentially arranged in the first insulator in a length direction thereof, the first electrical connection portion, the second electrical connection portion and the third electrical connection portion are connected to a first cable, a second cable and a third cable, respectively; one of the first electrical connection portion, the second electrical connection portion and the third electrical connection portion is a power supply electrical connection portion, and at least one of the first electrical connection portion, the second electrical connection portion and the third electrical connection portion is a signal connection portion;
- the bottom of the first insulator is provided with a front plugging portion and a rear plugging portion extending downwards, and the front plugging portion and the rear plugging part are respectively located on the front side and the rear side of the first insulator.

Alternatively, the front plugging portion and the rear plugging portion have different lengths.

Alternatively, the outer side of one end, away from the first electrical connection portion, of the front plugging portion or the rear plugging portion is provided with a groove at the bottom of the first insulator.

Alternatively, the front plugging portion includes a first front plugging portion and a second front plugging portion. The first front plugging portion is located on the front side of the first electrical connection portion and the front side of the second electrical connection portion, and the second front plugging portion is located on the front side of the third electrical connection portion. The rear plugging portion includes a first rear plugging portion and a second rear plugging portion, the first rear plugging portion is located on the rear side of the first electrical connection portion and the rear side of the second electrical connection portion, and the second rear plugging portion is located on the rear side of the third electrical connection portion. The second front plugging portion and the second rear plugging portion have different lengths.

Alternatively, the first electrical connection portion is connected to the second electrical connection portion, and a first clearance is provided between the second electrical connection portion and the third electrical connection portion adjacent to the second electrical connection portion. There are at least two the third electrical connection portions, and a second clearance is provided between the adjacent third electrical connection portions.

Alternatively, the front side and the rear side of each of the third electrical connection portions are respectively provided with one of the second front plugging portions and one of the second rear plugging portions, a third clearance is provided between the adjacent second front plugging portions, and a fourth clearance is provided between the adjacent second rear plugging portions.

Alternatively, there are two grooves, and the two grooves are respectively arranged on the outer sides of the ends, away from the first electrical connection portion, of the two second front plugging portions, or the two grooves are respectively arranged on the outer sides of the ends, away from the first electrical connection portion, of the two second rear plugging portions.

Alternatively, the bottom of the first insulator is provided with a first positioning portion extending downwards.

Alternatively, the front end face of the first insulator is provided with a protruded portion, the first front plugging portion is located at the bottom of the protruded portion, and the first positioning portion is located at the bottom of the protruded portion.

Alternatively, the plugging portion is platy, and the first positioning portion is columnar.

Alternatively, the bottoms of the left side face and the right side face of the first insulator are provided with second positioning portions extending downwards, a seventh clearance is provided between one of the second positioning portions and the first front plugging portion, an eighth clearance is provided between the other of the second positioning portions and the first rear plugging portion, and the second positioning portion is platy.

Alternatively, the first electrical connection portion is a power supply connection portion, and the second electrical connection portion is a sideband signal connection portion.

Alternatively, the third electrical connection portion includes at least one of a sideband signal connection portion and a differential signal connection portion.

Alternatively, one side of the first insulator is provided with a cable outlet, and the first cable, the second cable and the third cable extend outwards via the cable outlet.

Alternatively, the cable connector further includes a lock latch. The lock latch is arranged on the second front plugging portion, and the second front plugging portion is provided with a lock groove. the lock latch includes a lock plate bent into a U shape, one face of the lock plate is clamped into the lock groove, and the other face of the lock plate is a free end exposed to the outside. the outer side of the other face of the lock plate is provided with convex lock tabs, and the upper end of the other face of the lock plate is provided with a pull tab.

Alternatively, the front plugging portion includes a first front plugging portion and a second front plugging portion. the first front plugging portion is located on the front side of the first electrical connection portion or located on the front sides of the first electrical connection portion and the second electrical connection portion. The second front plugging portion is located on the front side of the third electrical connection portion; the rear plugging portion includes a second rear plugging portion, the second rear plugging portion is located on the rear side of the third electrical connection portion, and the second front plugging portion and the second rear plugging portion have different lengths.

Alternatively, the cable connector further includes a printed circuit board. A lower portion of the printed circuit board extends downwards to form a first plugboard portion and a second plugboard portion, and a first clearance is provided between the first plugboard portion and the second plugboard portion. The first electrical connection portion and the second electrical connection portion are arranged on the first plugboard portion at an interval, and the third electrical connection portion is arranged on the second plugboard portion. There is one third electrical connection portion.

Alternatively, there is one groove. The groove is arranged on the outer side of one end, away from the first electrical connection portion, of the second front plugging portion, or the groove is arranged on the outer side of one end, away from the first electrical connection portion, of the second rear plugging portion.

Alternatively, the cable outlet is formed in the top of the first insulator.

Alternatively, one of the front plugging portions and one of the rear plugging portions are arranged on the front side and the rear side of the first electrical connection portion, the second electrical connection portion and the third electrical connection portion, respectively.

Alternatively, the cable connector further includes a printed circuit board. A lower portion of the printed circuit board extends downwards to form an integrated plugboard portion, and the first electrical connection portion, the second electrical connection portion and the third electrical connection portion are arranged on the plugboard portion at an interval.

The present invention further provides a connector assembly. The connector assembly includes the cable connector above and a board connector.

Alternatively, the board connector includes:

- a second insulator, wherein a first terminal set, a second terminal set and a third terminal set are sequentially arranged in the second insulator in a length direction thereof, the first terminal set, the second terminal set and the third terminal set are in plug-fit with the first electrical connection portion, the second electrical connection portion and the third electrical connection portion, respectively; and
- a housing, sleeved outside the second insulator, wherein a front plugging slot in plug-fit with the front plugging portion is arranged between the front side of the second insulator and the front end face of the housing, and a rear plugging slot in plug-fit with the rear plugging portion is arranged between the rear side of the second insulator and the rear end face of the housing.

The cable connector and connector assembly provided by the present invention has the beneficial effects as follows:

1. The first electrical connection portion, the second electrical connection portion and the third electrical connection portion, including a power supply connection portion and a signal connection portion, are integrated by the cable connector, and thus the space is saved. Moreover, the front plugging portion and the rear plugging portion located on the front side and the rear side of the first insulator can be stably plugged into the plugging slots on the board connector.
2. The front plugging portion and the rear plugging portion located on the front side and the rear side of the first insulator have different lengths so as to prevent the cable connector from being plugged reversely.
3. The bottom of the first insulator of the cable connector is provided with the first positioning portion, and the first positioning can be in plug-fit with the positioning slot on the board connector to play a role in guiding positioning and plugging, thus the plugging stability is improved.

Other features and advantages of the invention will be described in detail in the detailed description which follows.

BRIEF DESCRIPTION OF THE DRAWINGS

The above and other objects, features and advantages of the present invention will become more apparent from a more detailed description of exemplary embodiments of the present invention with combination of the accompanying drawings, wherein the same reference numerals generally refer to the same parts in the exemplary embodiments of the present invention.

In the drawings.

Figure 1:
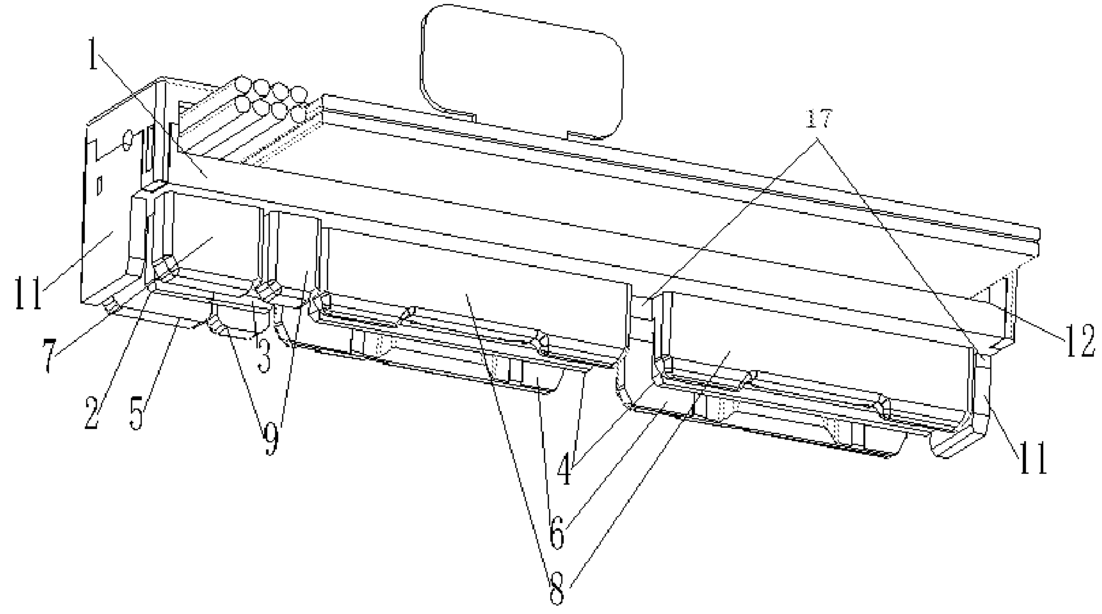
FIG. 1 shows a schematic diagram of a three-dimensional structure of a cable connector in accordance with a first embodiment of the present invention from one perspective.

1—First insulator; 2—first electrical connection portion; 3—second electrical connection portion; 4—third electrical connection portion; 5—first front plugging portion; 6—second front plugging portion; 7—first rear plugging portion; 8—second rear plugging portion; 9—first positioning portion; 10—protruded portion; 11—second positioning portion; 12—cable outlet; 13—lock latch; 14—lock tab; 15—pull tab; 16—housing; 17—groove.

DESCRIPTION OF THE EMBODIMENTS

Preferred embodiments of the present invention will be described in more detail below. While the present invention has been described in terms of the preferred embodiments of the present invention, it should be understood that the present invention may be embodied in a variety of forms and should not be limited by the embodiments set forth herein. Rather, these embodiments are provided so that this disclosure will be thorough and complete, and the scope of the present invention may be fully conveyed to those skilled in the art.

The present invention provides a cable connector. The cable connector includes:

a first insulator, wherein a first electrical connection portion, a second electrical connection portion and a third electrical connection portion are sequentially arranged in the first insulator in a length direction thereof, the first electrical connection portion, the second electrical connection portion and the third electrical connection portion are connected to a first cable, a second cable and a third cable, respectively; one of the first electrical connection portion, the second electrical connection portion and the third electrical connection portion is a power supply electrical connection portion, and at least one of the first electrical connection portion, the second electrical connection portion and the third electrical connection portion is a signal connection portion.

The bottom of the first insulator is provided with a front plugging portion and a rear plugging portion extending downwards, and the front plugging portion and the rear plugging part are respectively located on the front side and the rear side of the first insulator.

Specifically, the first electrical connection portion, the second electrical connection portion and the third electrical connection portion, including a power supply connection portion and a signal connection portion, are integrated into the same first insulator of the cable connector, which not only achieves the integration of the number of terminal sets, but also achieves the integration and expansion of the functions of the terminal sets, thus the space is saved, and the layout is facilitated. A front plugging portion and a rear plugging portion are respectively arranged on both sides of the first insulator to achieve the plugging of the cable connector with a front cable outlet and a rear cable outlet; and the front plugging portion and the rear plugging portion can be stably plugged into plugging slots on a board connector.

Alternatively, the front plugging portion and the rear plugging portion have different lengths.

Specifically, due to the fact that the front plugging portion and the rear plugging portion have different lengths, the cable connector can be prevented from being plugged reversely.

Alternatively, the outer side of one end, away from the first electrical connection portion, of the front plugging portion or the rear plugging portion is provided with a groove at the bottom of the first insulator.

Specifically, the groove is provided to be in fit with a protrusion on the corresponding board connector to play a role in assisting plugging, thus improving the plugging stability.

Alternatively, the front plugging portion includes a first front plugging portion and a second front plugging portion. The first front plugging portion is located on the front side of the first electrical connection portion and the front side of the second electrical connection portion, and the second front plugging portion is located on the front side of the third electrical connection portion. The rear plugging portion includes a first rear plugging portion and a second rear plugging portion, the first rear plugging portion is located on the rear side of the first electrical connection portion and the rear side of the second electrical connection portion, and the second rear plugging portion is located on the rear side of the third electrical connection portion. The second front plugging portion and the second rear plugging portion have different lengths.

Specifically, the first front plugging portion and the first rear plugging portion are symmetrically arranged on the front and rear sides of the first electrical connection portion and the second electrical connection portion. The front side and the rear side of each of the third electrical connection portions are respectively provided with a second front plugging portion and a second rear plugging portion. The cable connector is prevented from being plugged reversely due to the different lengths of the second front plugging portion and the second rear plugging portion.

Alternatively, the first electrical connection portion, the second electrical connection portion and the third electrical connection portion are integrated on the same circuit board. The circuit board is provided with a plugboard portion extending downwards, and the plugboard portion is provided with gold fingers to be plugged with the terminal sets on the board connector.

Alternatively, the cable connector further includes a printed circuit board. A lower portion of the printed circuit board extends downwards to form a first plugboard portion and a second plugboard portion, and a first clearance is provided between the first plugboard portion and the second plugboard portion. The first electrical connection portion and the second electrical connection portion are arranged on the first plugboard portion at an interval, the third electrical connection portion is arranged on the second plugboard portion. There are at least two third electrical connection portions, the at least two third electrical connection portions are spaced from each other, and a second clearance is provided between the adjacent third electrical connection portions.

Specifically, the first electrical connection portion, the second electrical connection portion and the third electrical connection portion are integrated on the same printed circuit board. The circuit board is provided with a first plugboard portion and a second plugboard portion extending downwards. The first plugboard portion and the second plugboard portion are provided with gold fingers to be plugged with the terminal sets on the board connector. The first electrical connection portion and the second electrical connection portion are arranged on the same first plugboard portion with sufficient electrical clearance kept therebetween. Sufficient electrical clearance is kept between the adjacent third electrical connection portions through the second clearance. Moreover, different third electrical connection portions are located on different second plugboard portions to form a plurality of plugging and unplugging structures, thus guaranteeing the plugging and unplugging stability.

Alternatively, the front side and the rear side of each of the third electrical connection portions are respectively provided with one of the second front plugging portions and one of the second rear plugging portions, a third clearance is provided between the adjacent second front plugging portions, and a fourth clearance is provided between the adjacent second rear plugging portions.

Specifically, the two adjacent second front plugging portions as well as the two adjacent second rear plugging portions are also spaced from each other to form plugging and unplugging structures independent of each other, thus improving the plugging and unplugging stability.

Alternatively, there are two grooves, and the two grooves are respectively arranged on the outer sides of the ends, away from the first electrical connection portion, of the two second front plugging portions, or the two grooves are respectively arranged on the outer sides of the ends, away from the first electrical connection portion, of the two second rear plugging portions.

Specifically, for the cable connector including two second front plugging portions and/or including two second rear plugging portions, there are two grooves, and the two grooves may be arranged to close to the front side of the first insulator, or may be arranged to close to the rear side of the first insulator.

Further, one of the grooves is located between the two second front plugging portions, i.e., the position corresponds to the third clearance, or one of the grooves is located between the two second rear plugging portions, i.e., the position corresponds to the fourth clearance.

Alternatively, the bottom of the first insulator is provided with a first positioning portion extending downwards.

Specifically, the first positioning portion can be in plug-fit with the positioning slot on the board connector to play a role in guiding positioning and plugging, and thus the plugging stability is improved.

Alternatively, the front end face of the first insulator is provided with a protruded portion, the first front plugging portion is located at the bottom of the protruded portion, and the first positioning portion is located at the bottom of the protruded portion.

In an example, two first positioning portions are respectively arranged on one side of the first front plugging portion and one side of the first rear plugging portion; a fifth clearance is provided between one of the first positioning portions and the first front plugging portion, and a sixth clearance is provided between the other of the positioning portions and the first rear plugging portion.

Specifically, in order to adapt to the dimension of a housing where a first terminal set and a second terminal set of the board connector are located, the end face of the first insulator is provided with a protruded portion, the first front plugging portion is located at the bottom of the protruded portion, and the first front plugging portion protrudes outwards compared to the second front plugging portion.

Alternatively, the plugging portion is platy, and the first positioning portion is columnar.

Alternatively, the bottoms of the left side face and the right side face of the first insulator are provided with second positioning portions extending downwards, a seventh clearance is provided between one of the second positioning portions and the first front plugging portion, an eighth clearance is provided between the other of the second positioning portions and the first rear plugging portion, and the second positioning portion is platy.

Alternatively, the plugging portion is platy, and the first positioning portion is columnar.

Specifically, when the cable connector is plugged into the corresponding board connector, the two second positioning portions are respectively attached to the outer side of a housing of the board connector to play a role in plugging-unplugging positioning and guiding, thus further improving the plugging stability.

Alternatively, the first electrical connection portion is a power supply connection portion, and the second electrical connection portion is a sideband signal connection portion.

Specifically, the cable connector achieves the integration of the power supply connection and sideband signal connection through the arrangement of the power supply connection portion and the sideband signal connection portion. The function of the cable connector is expanded, the multifunctional integrated design is achieved, and the integration of the functions of the electrical connector is achieved on the basis of achieving the integration of the number of the electrical connection portions.

Alternatively, the third electrical connection portion includes at least one of a sideband signal connection portion and a differential signal connection portion.

Specifically, at least one of a sideband signal and a differential signal can be selected as a signal transmitted by the third electrical connection portion as required, thus achieving the diversity of signal transmission.

Alternatively, one side of the first insulator is provided with a cable outlet, and the first cable, the second cable and the third cable extend outwards via the cable outlet.

Specifically, the cable connectors may be divided into a front-outlet connector and a rear-outlet connector according to different outlet directions.

Alternatively, the cable connector further includes a lock latch. The lock latch is arranged on the second front plugging portion, and the second front plugging portion is provided with a lock groove. The lock latch includes a lock plate bent into a U shape, one face of the lock plate is clamped into the lock groove, and the other face of the lock plate is a free end exposed to the outside; the outer side of the other face of the lock plate is provided with convex lock tabs, and the upper end of the other face of the lock plate is provided with a pull tab.

Specifically, the lock plate bent into the U shape is elastic. When the pull tab is pulled or the other face of the lock plate is pressed, the lock tabs on the other face of the lock plate may be driven to retract from the lock holes on the board connector, and the cable connector may be unplugged at the moment.

Further, the lock groove includes two a left lock groove and a right lock groove. The left lock groove and the right lock groove are respectively located on the two adjacent second front plugging portions. The lock latch is arranged on the ends, close to each other, of the two second front plugging portions to guarantee that the two lock tabs on the lock plate are centered on the first insulator as much as possible, and thus the two lock tabs can be stressed uniformly.

Alternatively, the front plugging portion includes a first front plugging portion and a second front plugging portion. The first front plugging portion is located on the front side of the first electrical connection portion or located on the front sides of the first electrical connection portion and the second electrical connection portion, and the second front plugging portion is located on the front side of the third electrical connection portion. The rear plugging portion includes a second rear plugging portion, the second rear plugging portion is located on the rear side of the third electrical connection portion; and the second front plugging portion and the second rear plugging portion have different lengths.

Alternatively, the cable connector further includes a printed circuit board. A lower portion of the printed circuit board extends downwards to form a first plugboard portion and a second plugboard portion, and a first clearance is provided between the first plugboard portion and the second plugboard portion. The first electrical connection portion and the second electrical connection portion are arranged on the first plugboard portion at an interval, the third electrical connection portion is arranged on the second plugboard portion, and there is one third electrical connection portion.

Alternatively, there is one groove, the groove is arranged on the outer side of the end, away from the first electrical connection portion, of the second front plugging portion, or the groove is arranged on the outer side of the end, away from the first electrical connection portion, of the second rear plugging portion.

Specifically, for the cable connector including only one second front plugging portion and/or including only one second rear plugging portion, there is one groove. The groove is arranged on one side of the second front plugging portion or the groove is arranged on one side of the second rear plugging portion.

Alternatively, the cable outlet is formed in the top of the first insulator.

Alternatively, one of the front plugging portions and one of the rear plugging portions are arranged on the front side and the rear side of the first electrical connection portion, the second electrical connection portion and the third electrical connection portion, respectively.

Alternatively, the cable connector further includes a printed circuit board. A lower portion of the printed circuit board extends downwards to form an integrated plugboard portion, and the first electrical connection portion, the second electrical connection portion and the third electrical connection portion are arranged on the plugboard portion at an interval.

The present invention further provides a connector assembly. The connector assembly includes the cable connector above and a board connector.

Alternatively, the board connector includes:

a second insulator, wherein a first terminal set, a second terminal set and a third terminal set are sequentially arranged in the second insulator in a length direction thereof, the first terminal set, the second terminal set and the third terminal set are in plug-fit with the first electrical connection portion, the second electrical connection portion and the third electrical connection portion, respectively; and a housing, sleeved outside the second insulator, wherein a front plugging slot in plug-fit with the front plugging portion is arranged between the front side of the second insulator and the front end face of the housing, and a rear plugging slot in plug-fit with the rear plugging portion is arranged between the rear side of the second insulator and the rear end face of the housing.

Specifically, the cable connector is an integrated cable connector. When the cable connector is plugged into the board connector, the front plugging portion and the rear plugging portion on the cable connector are in plug-fit with the front plugging slot and the rear plugging slot, respectively, thus achieving stable plugging.

First Embodiment

Figure 2:
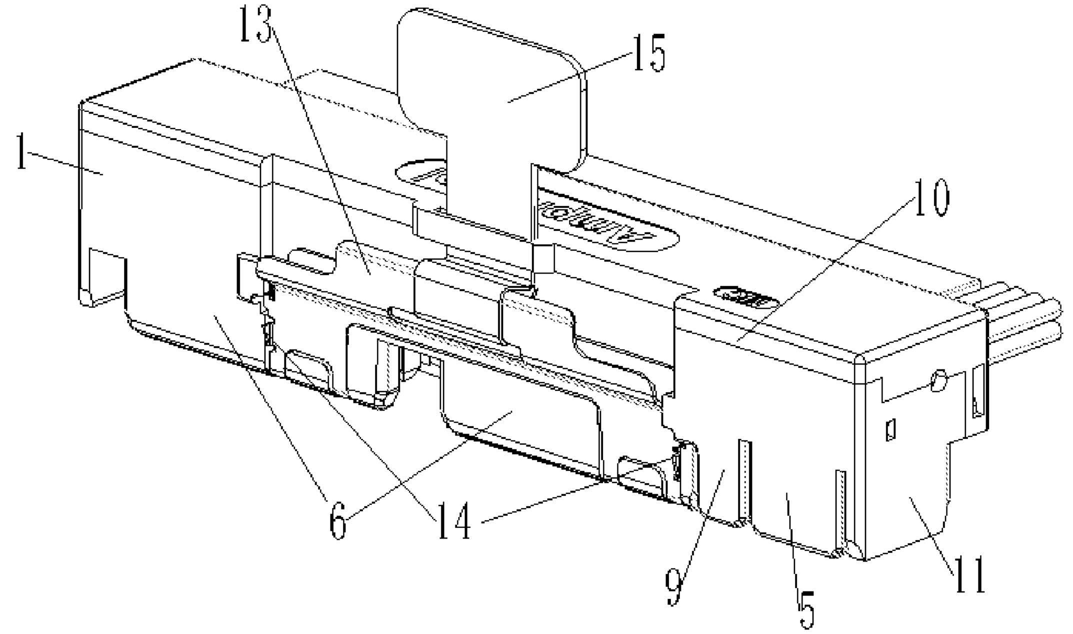
FIG. 2 shows a schematic diagram of a three-dimensional structure of a cable connector in accordance with a first embodiment of the present invention from another perspective.

As shown in FIG. 1 and FIG. 2, the present invention provides a cable connector. The cable connector includes:

a first insulator 1, wherein a first electrical connection portion 2, a second electrical connection portion 3 and a third electrical connection portion 4 are sequentially arranged in the first insulator 1 in a length direction thereof; the first electrical connection portion 2, the second electrical connection portion 3 and the third electrical connection portion 4 are connected to a first cable, a second cable and a third cable, respectively; one of the first electrical connection portion 2, the second electrical connection portion 3 and the third electrical connection portion 4 is a power supply electrical connection portion, and at least one of the first electrical connection portion 2, the second electrical connection portion 3 and the third electrical connection portion 4 is a signal connection portion.

The bottom of the first insulator 1 is provided with a front plugging portion and a rear plugging portion extending downwards, and the front plugging portion and the rear plugging part are respectively located on the front side and the rear side of the first insulator 1.

In accordance with the embodiment, the front plugging portions and the rear plugging portion have different lengths.

In accordance with the embodiment, the outer side of one end, away from the first electrical connection portion 2, of the front plugging portion or the rear plugging portion is provided with a groove 17 at the bottom of the first insulator 1.

In accordance with the embodiment, the front plugging portion includes a first front plugging portion 5 and a second front plugging portion 6. The first front plugging portion 5 is located on the front side of the first electrical connection portion 2 and the front side of the second electrical connection portion 3, and the second front plugging portion 6 is located on the front side of the third electrical connection portion 4. The rear plugging portion includes a first rear plugging portion 7 and a second rear plugging portion 8, the first rear plugging portion 7 is located on the rear side of the first electrical connection portion 2 and the rear side of the second electrical connection portion 3, and the second rear plugging portion 8 is located on the rear side of the third electrical connection portion 4. The second front plugging portion 6 and the second rear plugging portion 8 have different lengths.

In accordance with the embodiment, the cable connector further includes a printed circuit board. A lower portion of the printed circuit board extends downwards to form a first plugboard portion and a second plugboard portion, and a first clearance is provided between the first plugboard portion and the second plugboard portion. The first electrical connection portion 2 and the second electrical connection portion 3 are arranged on the first plugboard portion at an interval, and the third electrical connection portion 4 is arranged on the second plugboard portion. There are at least two third electrical connection portions 4, the at least two third electrical connection portions 4 are spaced from each other, and a second clearance is provided between the adjacent third electrical connection portions 4.

In accordance with the embodiment, the front side and the rear side of each of the third electrical connection portions 4 are respectively provided with one of the second front plugging portions 6 and one of the second rear plugging portions 8, a third clearance is provided between the adjacent second front plugging portions 6, and a fourth clearance is provided between the adjacent second rear plugging portions 8.

In accordance with the embodiment, there are two grooves 17, and the two grooves 17 are respectively arranged on the outer sides of the ends, away from the first electrical connection portion 2, of the two second front plugging portions 6, or the two grooves 17 are respectively arranged on the outer sides of the ends, away from the first electrical connection portion 2, of the two second rear plugging portions 8.

In accordance with the embodiment, the bottom of the first insulator 1 is provided with a first positioning portion 9 extending downwards.

In accordance with the embodiment, the front end face of the first insulator 1 is provided with a protruded portion 10, the first front plugging portion 5 is located at the bottom of the protruded portion 10, and the first positioning portion 9 is located at the bottom of the protruded portion 10.

In accordance with the embodiment, the plugging portion is platy, and the first positioning portion 9 is columnar.

In accordance with the embodiment, the bottoms of the left side face and the right side face of the first insulator 1 are provided with second positioning portions 11 extending downwards, a seventh clearance is provided between one of the second positioning portions 11 and the first front plugging portion 5, an eighth clearance is provided between the other of the second positioning portions 11 and the first rear plugging portion 7, and the second positioning portion 11 is platy.

In accordance with the embodiment, the first electrical connection portion 2 is a power supply connection portion, and the third electrical connection portion 4 is a differential signal connection portion.

In accordance with the embodiment, the second electrical connection portion 3 is a sideband signal connection portion.

In accordance with the embodiment, one side of the first insulator 1 is provided with a cable outlet 12, and the first cable, the second cable and the third cable extend outwards via the cable outlet 12.

In accordance with the embodiment, the cable connector further includes a lock latch 13. The lock latch 13 is arranged on the second front plugging portion 6, and the second front plugging portion 6 is provided with a lock groove. The lock latch 13 includes a lock plate bent into a U shape, one face of the lock plate is clamped into the lock groove, and the other face of the lock plate is a free end exposed to the outside; the outer side of the other face of the lock plate is provided with convex lock tabs 14, and the upper end of the other face of the lock plate is provided with a pull tab 15.

In conclusion, the first electrical connection portion 2, the second electrical connection portion 3 and the third electrical connection portion 4, including a power supply connection portion and a differential signal connection portion, are integrated into the same first insulator 1 by the cable connector provided by the present invention, thus the multi-functional integrated design of interfaces of the cable connector is achieved, the space is saved, and the product layout is facilitated. Moreover, the arrangement of the first positioning portion 9 and the second positioning portion 11 further improves the plugging stability when the cable connector is plugged with the board connector; and the second front plugging portion 6 and the second rear plugging portion 8 arranged on the front side and the rear side of the first insulator 1 have different lengths so as to prevent the cable connector from being plugged reversely.

Second Embodiment

Figure 3:
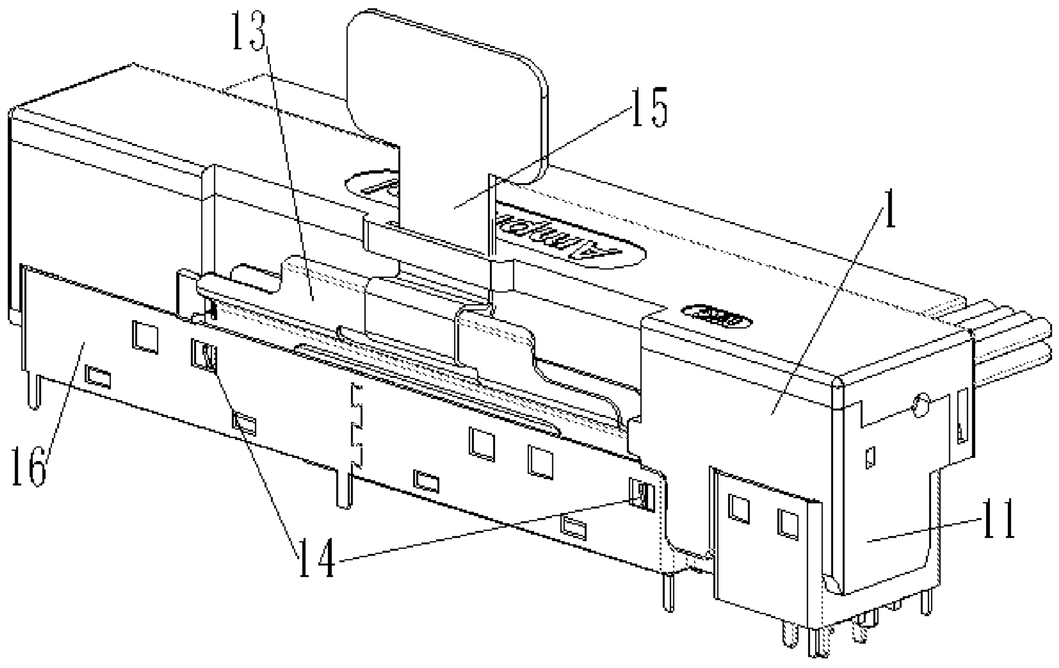
FIG. 3 shows a schematic diagram of a structure of a connector assembly in accordance with a second embodiment of the present invention when plugged with a rear-outlet cable connector.
Figure 4:
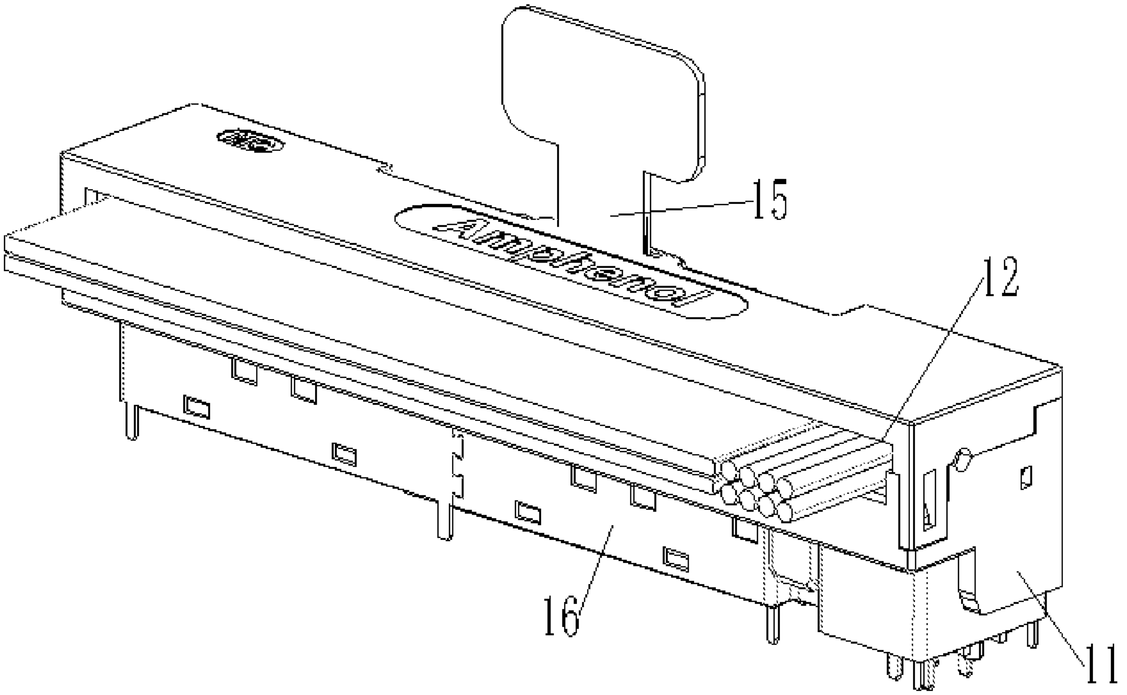
FIG. 4 shows a schematic diagram of a structure of a connector assembly in accordance with a second embodiment of the present invention when plugged with a front-outlet cable connector.

As shown in FIG. 3 and FIG. 4, the present invention further provides a connector assembly. The connector assembly includes the cable connector above and a board connector.

In accordance with the embodiment, the board connector includes:

- a second insulator, wherein a first terminal set, a second terminal set and a third terminal set are sequentially arranged in the second insulator in a length direction thereof, and the first terminal set, the second terminal set and the third terminal set are in plug-fit with the first electrical connection portion 2, the second electrical connection portion 3 and the third electrical connection portion 4, respectively; and
- a housing 16, sleeved outside the first insulator 1, wherein a front plugging slot in plug-fit with the front plugging portion is arranged between the front side of the second insulator and the front end face of the housing 16, and a rear plugging slot in plug-fit with the rear plugging portion is arranged between the rear side of the second insulator and the rear end face of the housing 16.

Specifically, as the board connector integrated with the first terminal set, the second terminal set and the third terminal set is used by the connector assembly to be in plug-fit with the cable connector above, the connector assembly achieves the integrated plugging and unplugging, which is not only saved in space and easy to assemble, but also can keep the outgoing cables neat. The front plugging slot and the rear plugging slot on the board connector have different lengths and are in plug-fit with the front plugging portion and the rear plugging portion, respectively, thus preventing the cable connector from being plugged reversely.

Third Embodiment

Figure 5:
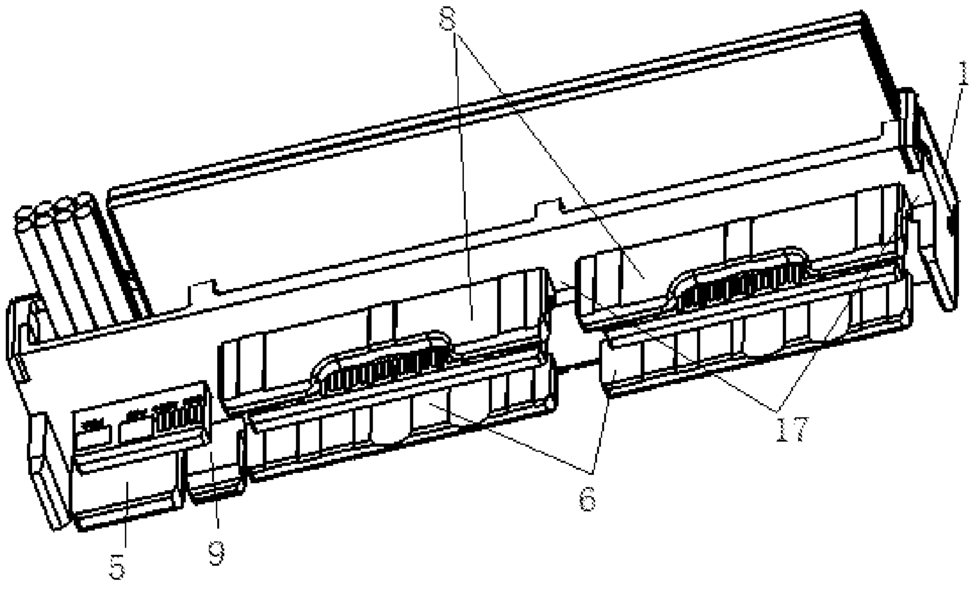
FIG. 5 shows a schematic diagram of a three-dimensional structure of a cable connector in accordance with a third embodiment of the present invention from one perspective.
Figure 6:
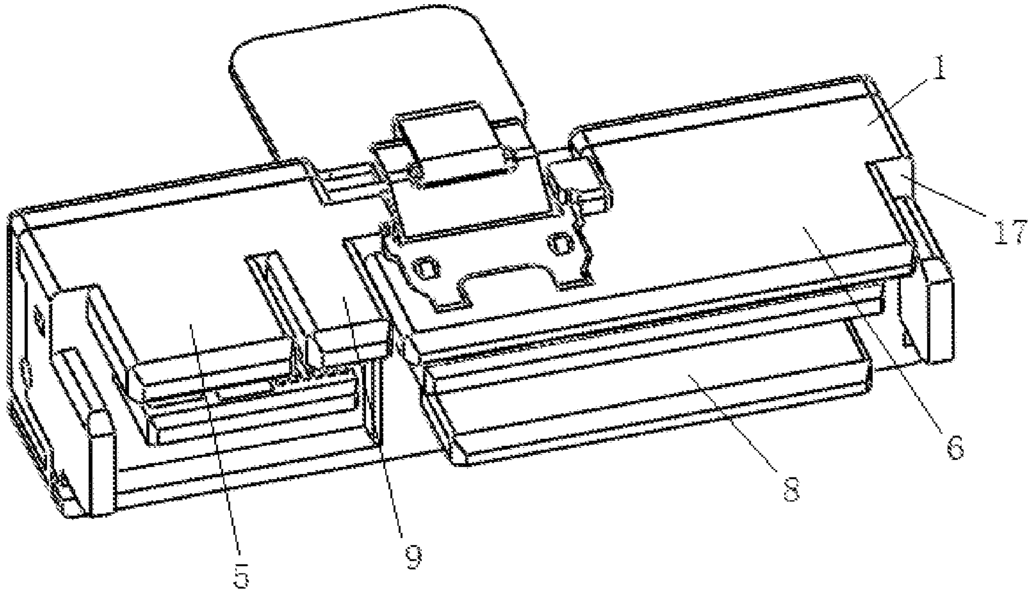
FIG. 6 shows a schematic diagram of a three-dimensional structure of another cable connector in accordance with a third embodiment of the present invention from one perspective.
Figure 7:
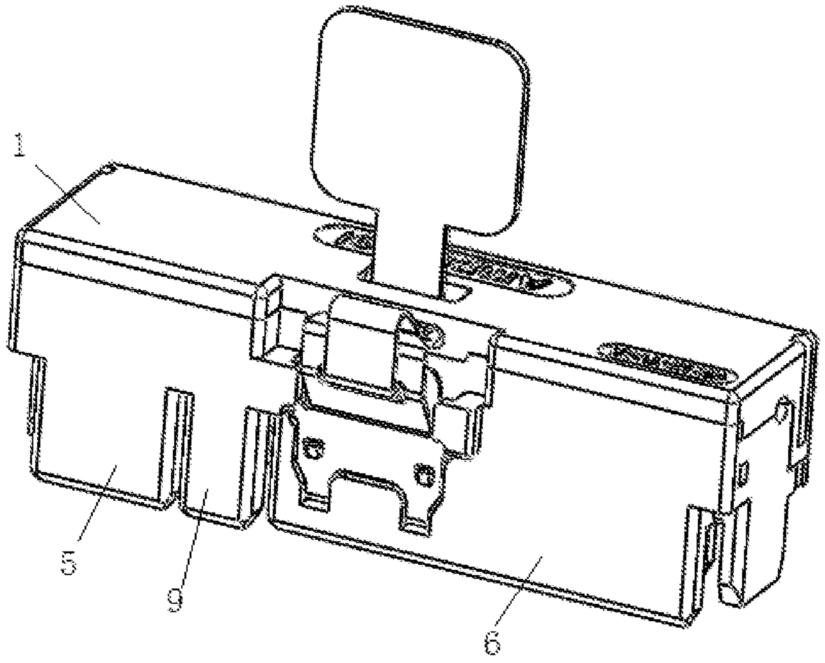
FIG. 7 shows a schematic diagram of a three-dimensional structure of another cable connector in accordance with a third embodiment of the present invention from another perspective.

As shown in FIG. 5 to FIG. 7, the difference between the embodiment and the first embodiment is as follows:

In accordance with the embodiment, the front plugging portion includes a first front plugging portion 5 and a second front plugging portion 6. The first front plugging portion 5 is located on the front side of the first electrical connection portion 2 or located on the front sides of the first electrical connection portion 2 and the second electrical connection portion 3, and the second front plugging portion 6 is located on the front side of the third electrical connection portion 4. The rear plugging portion includes a second rear plugging portion 8, the second rear plugging portion 8 is located on the rear side of the third electrical connection portion 4; and the second front plugging portion 6 and the second rear plugging portion 8 have different lengths.

Specifically, as shown in FIG. 5, there may be two third electrical connection portions 4, two second front plugging portions 6 and two second rear plugging portions 8, while the rear plugging portion only includes the second rear plugging portion 8, without the first rear plugging portion.

In accordance with the embodiment, the cable connector further includes a printed circuit board. A lower portion of the printed circuit board extends downwards to form a first plugboard portion and a second plugboard portion, and a first clearance is provided between the first plugboard portion and the second plugboard portion. The first electrical connection portion 2 and the second electrical connection portion 3 are arranged on the first plugboard portion at an interval, the third electrical connection portion 4 is arranged on the second plugboard portion, and there is one third electrical connection portion 4.

Specifically, as shown in FIG. 6, the cable connector in the embodiment is only provided with one third electrical connection portion, the size of which is less than that of the cable connector in the first embodiment, and thus the demands of the plugging strength and stability may be satisfied without providing the first plugboard portion and the first positioning portion 9 on the rear side of the first plugboard portion.

Further, in order to adapt to the cable connector in the embodiment, the structure of the lock latch is as shown in FIG. 7.

In accordance with the embodiment, there is one groove 17. The groove 17 is arranged on the outer side of one end, away from the first electrical connection portion 2, of the second front plugging portion 6, or the groove 17 is arranged on the outer side of one end, away from the first electrical connection portion 2, of the second rear plugging portion 8.

Fourth Embodiment

Figure 8:
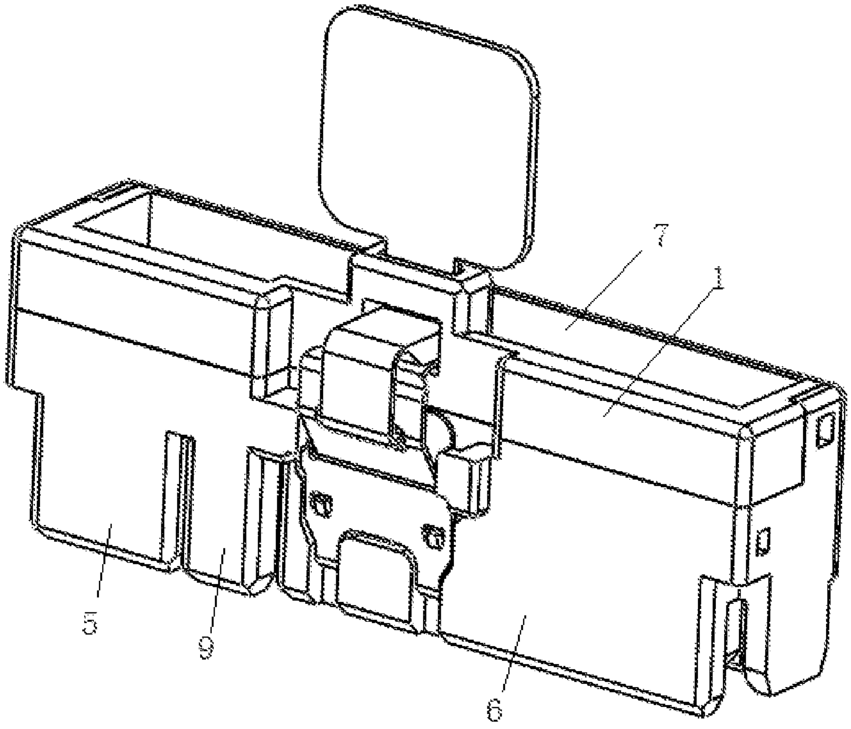
FIG. 8 shows a schematic diagram of a three-dimensional structure of a cable connector in accordance with a fourth embodiment of the present invention.

As shown in FIG. 8, the difference between the embodiment and the first embodiment is as follows:

In accordance with the embodiment, the cable outlet 12 is formed in the top of the first insulator 1.

Specifically, the cable connector may achieve top vertical outgoing through the cable outlet 12, so that the plugging space can be saved more during use, and more cable connectors may be plugged into a plugging region with the same area.

Figure 9:
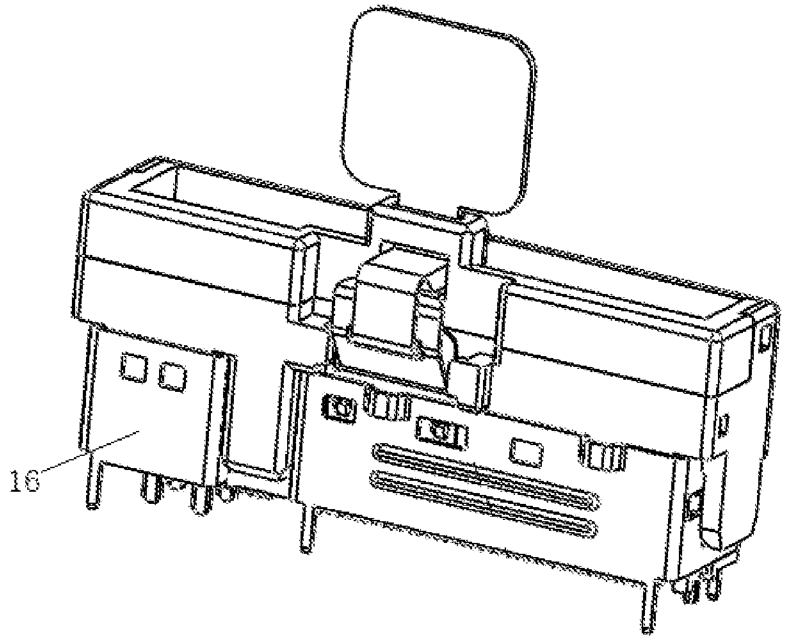
FIG. 9 shows a schematic diagram of a three-dimensional structure of a connector assembly in accordance with a fourth embodiment of the present invention.

Further, the cable connector in the embodiment can be in plug-fit with the corresponding board connector thereof to form a connector assembly as shown in FIG. 9.

Fifth Embodiment

Figure 10:
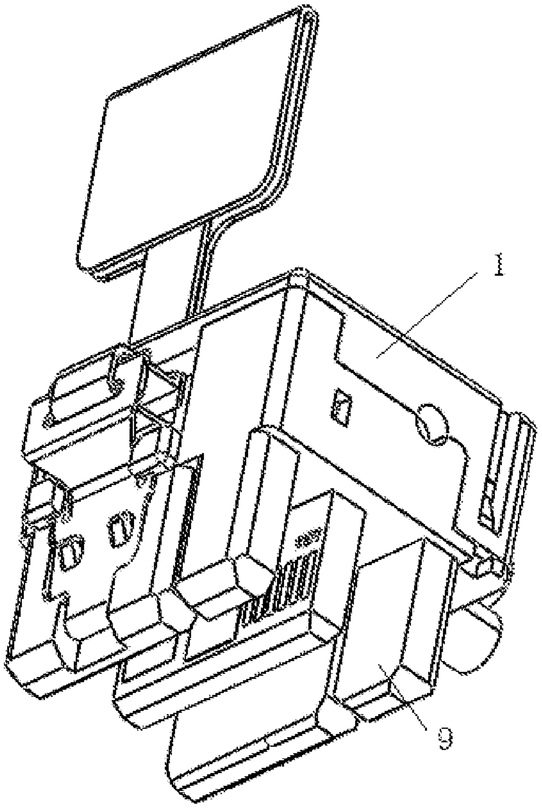
FIG. 10 shows a schematic diagram of a three-dimensional structure of a cable connector in accordance with a fifth embodiment of the present invention from one perspective.

As shown in FIG. 10, the difference between the embodiment and the first embodiment is as follows:

In accordance with the embodiment, one front plugging portion and one rear plugging portion are arranged on the front side and the rear side of the first electrical connection portion 2, the second electrical connection portion 3 and the third electrical connection portion 4, respectively.

In accordance with the embodiment, the cable connector further includes a printed circuit board. A lower portion of the printed circuit board extends downwards to form an integrated plugboard portion, and the first electrical connection portion 2, the second electrical connection portion 3 and the third electrical connection portion 4 are arranged on the plugboard portion at an interval.

Specifically, the cable connector in the embodiment is smaller in size and more compact in structure. The first electrical connection portion 2, the second electrical connection portion 3 and the third electrical connection portion 4 are arranged on one plugboard portion. Accordingly, the stable plugging may be achieved by using only one plugging portion and one first positioning portion 5. Moreover, the front plugging portion and the rear plugging portion may be set to have different lengths.

Figure 11:
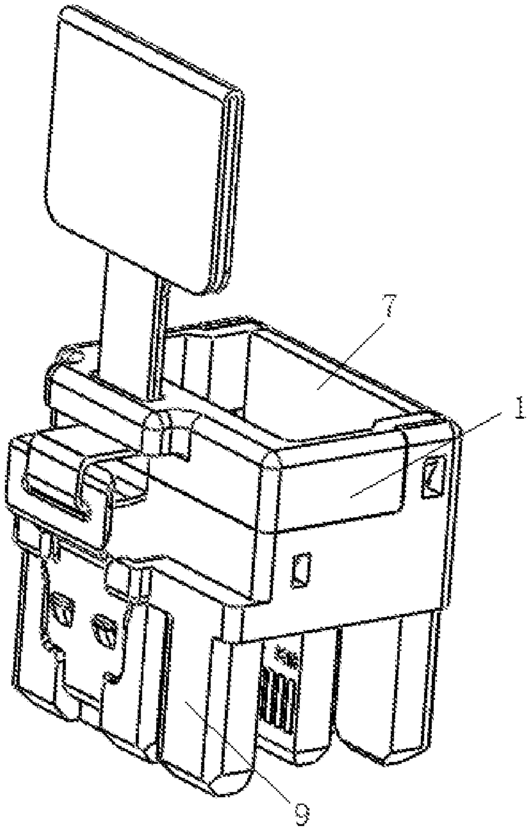
FIG. 11 shows a schematic diagram of a three-dimensional structure of another cable connector in accordance with a fifth embodiment of the present invention.
Figure 12:
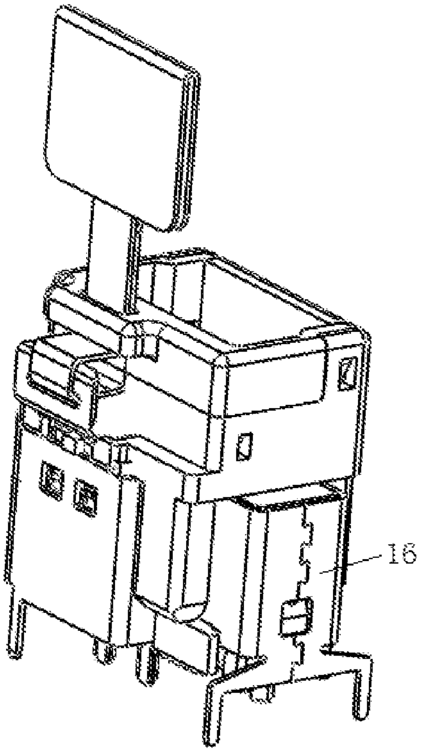
FIG. 12 shows a schematic diagram of a three-dimensional structure of a connector assembly in accordance with a fifth embodiment of the present invention.

Further, as shown in FIG. 11, in the cable connector in the embodiment, the cable outlet 7 may be arranged at the top of the first insulator 1. The cable connector in the embodiment may be in plug-fit with the corresponding board connector thereof to form a connector assembly as shown in FIG. 12.

The embodiments of the present invention have been described above, and the foregoing description is illustrative, not limiting, and not limited to the disclosed embodiments. Numerous modifications and changes will be apparent to those skilled in the art without departing from the scope and spirit of the illustrated embodiments.

What is claimed is:

1. A cable connector, comprising:

a first insulator, wherein a first electrical connection portion, a second electrical connection portion and a third electrical connection portion are sequentially arranged in the first insulator in a length direction thereof, the first electrical connection portion, the second electrical connection portion and the third electrical connection portion are connected to a first cable, a second cable and a third cable, respectively; one of the first electrical connection portion, the second electrical connection portion and the third electrical connection portion is a power supply electrical connection portion, and at least one of the first electrical connection portion, the second electrical connection portion and the third electrical connection portion is a signal connection portion;

the bottom of the first insulator is provided with a front plugging portion and a rear plugging portion extending downwards, and the front plugging portion and the rear plugging part are respectively located on the front side and the rear side of the first insulator.

2. The cable connector according to claim 1, wherein the front plugging portion and the rear plugging portion have different lengths.

3. The cable connector according to claim 1, wherein the outer side of one end, away from the first electrical connection portion, of the front plugging portion or the rear plugging portion is provided with a groove at the bottom of the first insulator.

4. The cable connector according to claim 3, wherein the front plugging portion comprises a first front plugging portion and a second front plugging portion; the first front plugging portion is located on the front side of the first electrical connection portion and the front side of the second electrical connection portion, and the second front plugging portion is located on the front side of the third electrical connection portion; the rear plugging portion comprises a first rear plugging portion and a second rear plugging portion, the first rear plugging portion is located on the rear side of the first electrical connection portion and the rear side of the second electrical connection portion, and the second rear plugging portion is located on the rear side of the third electrical connection portion; and the second front plugging portion and the second rear plugging portion have different lengths.

5. The cable connector according to claim 4, further comprising a printed circuit board, wherein a lower portion of the printed circuit board extends downwards to form a first plugboard portion and a second plugboard portion, and a first clearance is provided between the first plugboard portion and the second plugboard portion; the first electrical connection portion and the second electrical connection portion are arranged on the first plugboard portion at an interval, and the third electrical connection portion is arranged on the second plugboard portion; there are at least two third electrical connection portions, and the at least two third electrical connection portions are spaced from each other; and a second clearance is provided between the adjacent third electrical connection portions.

6. The cable connector according to claim 5, wherein the front side and the rear side of each of the third electrical connection portions are respectively provided with one of the second front plugging portions and one of the second rear plugging portions, a third clearance is provided between the adjacent second front plugging portions, and a fourth clearance is provided between the adjacent second rear plugging portions.

7. The cable connector according to claim 6, wherein there are two grooves, and the two grooves are respectively arranged on the outer sides of the ends, away from the first electrical connection portion, of the two second front plugging portions, or the two grooves are respectively arranged on the outer sides of the ends, away from the first electrical connection portion, of the two second rear plugging portions.

8. The cable connector according to claim 4, wherein the bottom of the first insulator is provided with a first positioning portion extending downwards.

9. The cable connector according to claim 8, wherein the front end face of the first insulator is provided with a protruded portion, the first front plugging portion is located at the bottom of the protruded portion, and the first positioning portion is located at the bottom of the protruded portion.

10. The cable connector according to claim 8, wherein the plugging portion is platy, and the first positioning portion is columnar.

11. The cable connector according to claim 4, wherein the bottoms of the left side face and the right side face of the first insulator are provided with second positioning portions extending downwards, a seventh clearance is provided between one of the second positioning portions and the first front plugging portion, an eighth clearance is provided between the other of the second positioning portions and the first rear plugging portion, and the second positioning portion is platy.

12. The cable connector according to claim 1, wherein the first electrical connection portion is a power supply connection portion, and the second electrical connection portion is a sideband signal connection portion.

13. The cable connector according to claim 12, wherein the third electrical connection portion comprises at least one of a sideband signal connection portion and a differential signal connection portion.

14. The cable connector according to claim 1, wherein one side of the first insulator is provided with a cable outlet, and the first cable, the second cable and the third cable extend outwards via the cable outlet.

15. The cable connector according to claim 6, further comprising a lock latch, wherein the lock latch is arranged on the second front plugging portion, the second front plugging portion is provided with a lock groove, the lock latch comprises a lock plate bent into a U shape, one face of the lock plate is clamped into the lock groove, and the other face of the lock plate is a free end exposed to the outside; the outer side of the other face of the lock plate is provided with convex lock tabs, and the upper end of the other face of the lock plate is provided with a pull tab.

16. The cable connector according to claim 1, wherein the front plugging portion comprises a first front plugging portion and a second front plugging portion, the first front plugging portion is located on the front side of the first electrical connection portion or located on the front sides of the first electrical connection portion and the second electrical connection portion; the second front plugging portion is located on the front side of the third electrical connection portion; the rear plugging portion comprises a second rear plugging portion, the second rear plugging portion is located on the rear side of the third electrical connection portion, and the second front plugging portion and the second rear plugging portion have different lengths.

17. The cable connector according to claim 16, further comprising a printed circuit board, wherein a lower portion of the printed circuit board extends downwards to form a first plugboard portion and a second plugboard portion, and a first clearance is provided between the first plugboard portion and the second plugboard portion; the first electrical connection portion and the second electrical connection portion are arranged on the first plugboard portion at an interval, the third electrical connection portion is arranged on the second plugboard portion, and there is one third electrical connection portion.

18. The cable connector according to claim 17, wherein there is one groove, the groove is arranged on the outer side of one end, away from the first electrical connection portion, of the second front plugging portion, or the groove is arranged on the outer side of one end, away from the first electrical connection portion, of the second rear plugging portion.

19. The cable connector according to claim 14, wherein the cable outlet is formed in the top of the first insulator.

20. The cable connector according to claim 1, wherein one of the front plugging portions and one of the rear plugging portions are arranged on the front side and the rear side of the first electrical connection portion, the second electrical connection portion and the third electrical connection portion, respectively.

21. The cable connector according to claim 20, further comprising a printed circuit board, wherein a lower portion of the printed circuit board extends downwards to form an integrated plugboard portion, and the first electrical connection portion, the second electrical connection portion and the third electrical connection portion are arranged on the plugboard portion at an interval.

22. A connector assembly, comprising the cable connector according to claim 1 and a board connector.

23. The cable assembly according to claim 22, wherein the board connector comprises:

a second insulator, wherein a first terminal set, a second terminal set and a third terminal set are sequentially arranged in the second insulator in a length direction thereof, the first terminal set, the second terminal set and the third terminal set are in plug-fit with the first electrical connection portion, the second electrical connection portion and the third electrical connection portion, respectively; and a housing, sleeved outside the second insulator, wherein a front plugging slot in plug-fit with the front plugging portion is arranged between the front side of the second insulator and the front end face of the housing, and a rear plugging slot in plug-fit with the rear plugging portion is arranged between the rear side of the second insulator and the rear end face of the housing.

* * * * *